United States Patent [19]
Wolf et al.

[11] Patent Number: 6,073,715
[45] Date of Patent: Jun. 13, 2000

[54] SAFETY SYSTEM FOR A MOTOR VEHICLE

[75] Inventors: Hans-Christoph Wolf, Stuttgart; Juergen Schenk, Albershausen, both of Germany

[73] Assignee: DaimlerChrysler AG, Germany

[21] Appl. No.: 08/879,776

[22] Filed: Jun. 20, 1997

[30] Foreign Application Priority Data

Jun. 21, 1996 [DE] Germany .......................... 196 24 824

[51] Int. Cl.$^7$ ............................. B60K 27/02; F02B 77/00
[52] U.S. Cl. ...................................... 180/197; 123/198 D
[58] Field of Search ................. 701/82, 92, 86; 180/197; 123/357, 198 D

[56] References Cited

U.S. PATENT DOCUMENTS

| | | | |
|---|---|---|---|
| 4,262,783 | 4/1981 | Scarrott et al. | 192/0.09 |
| 4,269,280 | 5/1981 | Rosen | 180/54 |
| 4,410,947 | 10/1983 | Strong et al. | 364/426 |
| 4,541,392 | 9/1985 | Ogino | 123/357 |
| 4,621,600 | 11/1986 | Hasegawa | 123/357 |
| 4,715,339 | 12/1987 | Sagawa et al. | 123/357 |
| 4,773,369 | 9/1988 | Kobayashi et al. | 123/357 |
| 4,779,595 | 10/1988 | Fujimori | 123/357 |
| 4,836,165 | 6/1989 | Kubota et al. | 123/357 |
| 4,933,855 | 6/1990 | Leiber et al. | 364/426.3 |
| 4,940,030 | 7/1990 | Morikawa . | |
| 5,018,383 | 5/1991 | Togai et al. . | |
| 5,111,789 | 5/1992 | Moriya et al. | 123/357 |
| 5,198,982 | 3/1993 | Kobayashi | 364/426.02 |
| 5,201,383 | 4/1993 | Kitagawa et al. | 180/197 |
| 5,207,198 | 5/1993 | Eisele | 123/357 |
| 5,370,094 | 12/1994 | Sorg et al. . | |
| 5,490,071 | 2/1996 | Akabane | 123/357 |
| 5,732,380 | 3/1998 | Iwata | 701/85 |
| 5,791,316 | 8/1998 | Houtz et al. | 123/357 |

FOREIGN PATENT DOCUMENTS

| | | |
|---|---|---|
| 39 13 609 | 11/1989 | Germany . |
| 39 14 167 | 11/1989 | Germany . |
| 39 24 922 | 2/1990 | Germany . |
| 43 15 885 | 5/1993 | Germany . |
| 44 07 475 | 9/1995 | Germany . |
| 7-119522 | of 1995 | Japan . |

Primary Examiner—Lanna Mai
Assistant Examiner—Jeff Restifo
Attorney, Agent, or Firm—Evenson, McKeown, Edwards & Lenahan, P.L.L.C.

[57] ABSTRACT

A safety system for a motor vehicle having an internal-combustion engine. Independent quantities are used for the engine control and for the monitoring of the engine control. Control of the internal-combustion engine is performed, for example, by way of an operating parameter characterizing the engine load. Preferably, monitoring of the engine control is integrated into a traction control system, in which case the desired value for a quantity characterizing the vehicle propulsion, such as the output torque, is transmitted by the engine control to the monitoring system, while the actual output torque is determined in the traction control system from the rotational wheel speed. If a fault is recognized in the traction control system during the continuous comparison of desired values and actual values, a signal is transmitted back to the engine control unit, to influence the engine control.

9 Claims, 1 Drawing Sheet

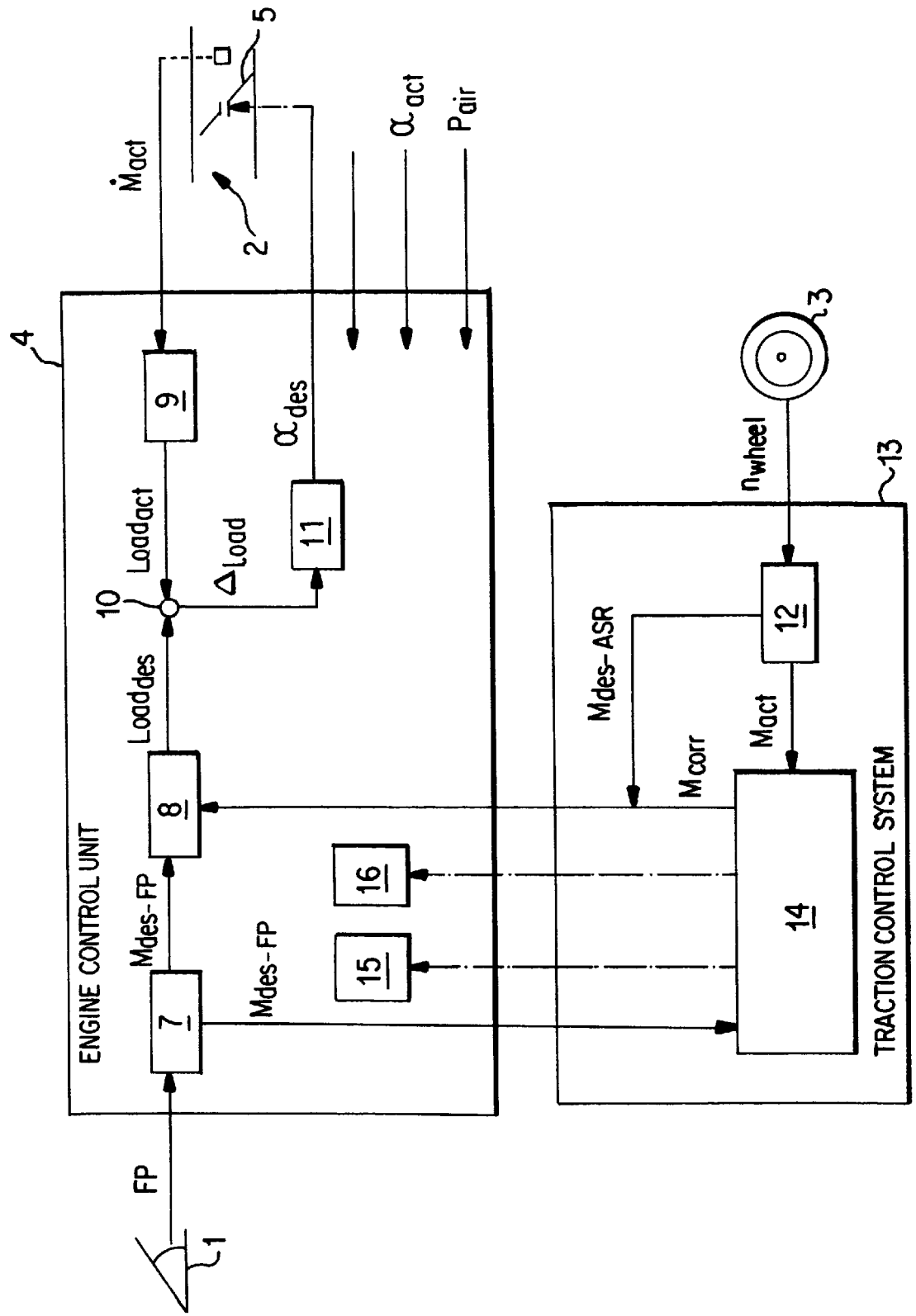

SAFETY SYSTEM FOR A MOTOR VEHICLE

BACKGROUND AND SUMMARY OF THE INVENTION

The invention relates to a safety system for a motor vehicle having an internal-combustion engine.

German Patent Document 39 14 167 A1 discloses a safety system for a motor vehicle internal-combustion engine in which the output torque of a transmission is monitored. If the determined torque exceeds a given minimal value, when the accelerator pedal is not depressed, operation of the internal-combustion engine is interrupted. This system has the disadvantage that it engages only when the accelerator pedal is not depressed. It cannot recognize other faulty functions.

In addition, systems are known which the throttle valve position is monitored. These systems have the disadvantage that a single quantity is used both for controlling the internal-combustion engine and for monitoring. Should a fault occur in this sensing, both the engine control and the monitoring device will operate with the wrong quantity. Another problem of this monitoring device occurs in the case of internal-combustion engines with a dynamic torque adjustment in which, particularly in dynamic operating conditions, there is no direct relationship between the throttle valve position and the engine load. Thus, in the case of such internal-combustion engines, monitoring cannot occur on the basis of the throttle valve position.

It is an object of the present invention to provide a safety system for a motor vehicle with an internal-combustion engine which ensures the safety of the motor vehicle in all operating ranges, and which can also be used for internal-combustion engines with a dynamic torque adjustment.

These and other objects and advantages are achieved according to the invention by using distinct independent quantities for controlling the engine on the one hand and for monitoring engine control on the other. According to the invention, control of the internal-combustion engine may be performed, for example, by way of an operating parameter indicative of engine load. Preferably, monitoring of the engine control is integrated into a traction control system, in which case the desired value for a quantity indicative of vehicle propulsion, such as the output torque, is transmitted by the engine control to the monitoring system, while the actual output torque is determined in the traction control system from the rotational wheel speed. If a fault is recognized in the traction control system during the continuous comparison of desired values and actual values, a signal is transmitted back to the engine control unit for influencing the engine control.

The safety system according to the invention has the advantage that, because independent quantities are used for the engine control and for the monitoring, if the sensing of one of the two quantities or one of the two control units fails, the other control unit can continue to operate properly, and to ensure at least an emergency operation or render the internal-combustion engine inoperative.

When the safety system is used in a vehicle having a traction control system, it can be integrated in the traction control system. This has the advantage that the rotational wheel speed is detected and processed directly by the traction control system. In addition, the traction control system has a high-priority access to the torque indication in the engine control. Existing connections can therefore be used for the communication between the safety system and the engine control.

Other objects, advantages and novel features of the present invention will become apparent from the following detailed description of the invention when considered in conjunction with the accompanying drawings.

BRIEF DESCRIPTION OF THE DRAWINGS

The single FIGURE shows the basic construction of a safety system according to the invention.

DETAILED DESCRIPTION OF THE DRAWINGS

The position FP of an accelerator pedal 1, at least one operating parameter indicative of the operating condition of the internal-combustion engine (such as the actual engine load, $load_{act}$) and at least one quantity characterizing the vehicle propulsion (such as the rotational speed of the wheel $n_{wheel}$) are determined and transmitted by way of data lines to the analyzing devices 4, 13. According to the embodiment, the load detection takes place indirectly by measuring the actual air mass flow $m_{act}$ in the intake pipe 2 of the internal-combustion engine (not shown). The actual air mass flow $m_{act}$ can, for example, be adjusted by means of a throttle valve 5 and can be determined by means of a hot-wire mass air flow meter 6.

The first analyzing device 4 is hereinafter referred to as an engine control unit. In the engine control unit 4, in block 7, a vehicle propulsion demand is determined from the accelerator pedal position FP (for example, a torque desired by the driver $M_{des-FP}$) and in block 8 a desired value is determined therefrom for the operating parameter indicative of the operating condition of the internal-combustion engine (for example, a desired load value, $load_{des}$). Simultaneously, in block 9, an actual load value $load_{act}$ is determined from the actual air mass flow $m_{act}$ and in block 10 is compared with the desired load value $load_{des}$ to determine a differential value $\Delta_{load}$. From this differential value $\Delta_{load}$, a desired throttle valve value $\alpha_{des}$ is then determined in block 11 and by means of a throttle valve adjustment (not shown), the throttle valve 5 is adjusted to this desired value $\alpha_{des}$.

The above-described steps are used for controlling the power of the internal-combustion engine or of the vehicle. For this purpose, additional operating parameters, such as the rotational engine speed or the engine temperature are provided to the engine control unit 4. Also, in addition to the throttle valve position, the engine control unit 4 influences other operating parameters, such as the ignition point (block 15) or the fuel quantity (block 16). Such processes are known from the state of the art (for example, from German Patent Document DE 43 15 885 C1) and will not be explained here in detail.

In the event of operating disturbances of the internal-combustion engine, for example, with respect to the sensing of the air mass flow $m_{act}$ or with respect to the adjustment of the throttle valve position $\alpha_{des}$, vehicle operation may be impaired, and the operating safety of the vehicle may even be influenced considerably. In particular, the throttle valve 5 may jam in the fully opened position. It is therefore necessary to provide a safety system which permits a safe operation of the vehicle despite the operating disturbance, or at least ensures that the internal-combustion engine is switched off.

According to the embodiment illustrated in the drawing, a sensor (not shown) for sensing a rotational wheel speed $n_{wheel}$ is provided for this purpose on at least one vehicle wheel 3. By way of a data line, this rotational wheel speed $n_{wheel}$ is transmitted to a second analyzing device 13, which is referably a traction control system. (However, a different control unit may also be used.) Traction control systems are also known from the state of the art, and will therefore be discussed only briefly.

The system illustrated in the drawing is a wheel slip control system, referred to hereinafter as an ASR-system. In such ASR-systems, the rotational speeds $n_{wheel}$ of several vehicle wheels 3 are compared with one another to detect operating conditions in which there is an excessive wheel slip. If such a condition is recognized, the ASR control unit 13 determines a reduced desired torque $M_{des-ASR}$ and transmits it to the engine control unit 4. In the engine control unit 4, this reduced desired torque $M_{des-ASR}$ is given a higher priority than the torque desired by the driver $M_{des-FP}$. This means that, as long as a reduced desired torque $M_{des-ASR}$ is present, engine control is carried out on the basis of the reduced desired torque $M_{des-ASR}$. Only if no reduced desired torque $M_{des-ASR}$ is present, will the engine control be performed on the basis of the torque desired by the driver $M_{des-FP}$. The determination of the desired torque $M_{des-ASR}$ takes place in the ASR control unit 13 (block 12) and is transmitted from there to the engine control unit 4 (block 8).

For the monitoring of the engine control, in addition, the actual output torque $M_{act}$ of the vehicle is determined in the ASR-control unit 13. For this purpose, the rotational speed signal $n_{wheel}$ is differentiated with respect to time in block 12, and is multiplied by the vehicle mass. The output torque $M_{act}$ is then transmitted to block 14, which also receives the desired torque indicated the driver $M_{des-FP}$, provided by the engine control unit 4. These two input quantities ($M_{act}$ and $M_{des-FP}$) are continuously compared with one another in block 14 and a corresponding differential value $\Delta M$ is calculated. In the normal operation of the internal-combustion engine, apart from fairly small fluctuations, the two quantities $M_{des-FP}$ and $M_{act}$ should essentially correspond to one another with deviations occurring, only when there is a fault function in signal detection, signal transmission or processing. For this reason, the differential value $\Delta M$ is continuously compared with a given threshold value $M_{thresh}$. If it is determined that the differential value $\Delta M$, exceeds the threshold value $M_{thresh}$, for a given time period, a fault is recognized.

Upon the occurrence of such a fault, different measures can be taken. In the simplest case, a fault signal generated in block 14 is indicated to the driver and/or is stored in a memory for a later analysis. However, the operating safety of the internal-combustion engine cannot be ensured on the basis of this measure alone. It may also be necessary to intervene in the engine control. One possibility is to determine a corrected desired torque $M_{corr}$ in block 14 on the basis of the differential value $\Delta M$, and transmit it to the engine control unit 4. The data line between block 12 in the ASR control unit 13 and block 8 in the engine control unit 4 which is provided for the ASR function is preferably used for this purpose. As a result, the corrected desired torque $M_{copp}$ is also processed with a higher priority in the engine control unit 4. Also, an additional data line is unnecessary.

It may occur in the operation of the internal-combustion engine that a corrected desired torque $M_{corr}$ is generated based on the monitoring function, and simultaneously a reduced desired torque $M_{des-ASR}$ is generated based on the traction control. In this case, it is possible to provide another block for comparing the two desired torques $M_{des-ASR}$, $M_{corr}$, with the smaller of the two desired torques $M_{des-ASR}$, $M_{corr}$ being transmitted to the engine control unit 4.

Another possible response to the recognition of a fault condition consists of reducing the output torque $M_{actual}$ by an ignition intervention, for example, a temporary advance or retarding of the ignition point. For this purpose, a corresponding fault signal is generated in block 14 and is transmitted via a data line to the ignition adjustment unit (block 15) in the engine control unit 4. If also this measure is not effective to limit the output torque $M_{act}$ to a value $M_{act}$ $<=M_{des-FP}$, the internal-combustion engine must possibly be rendered inoperative by switching off the fuel. For this purpose, a corresponding fault signal is again generated in block 14 and is transmitted by way of another data line to the fuel distributing system (block 16) in the engine control unit 4.

Block 14 therefore represents the actual module for monitoring the internal-combustion engine. Here, the torque desired by the driver $M_{des-FP}$ and output torque $M_{act}$ are compared and, in the case of a deviation, corresponding signals are sent to the engine control unit 4 to prevent an excessive output torque $M_{act}$, by reducing the load indication (block 8), ignition intervention (block 15), and/or interruption of the fuel supply 16.

The exchange of data or measuring signals between the individual sensors and analyzing devices 4, 4' can be implemented by way of arbitrary data connections. In the simplest case, all units are connected by simple electric lines. However, the data exchange can also take place by way of a data bus, if one is provided in the vehicle, that all information is available on all connected units. If either the engine control unit 4 or the data bus fails, the throttle valve adjustment generally has a mechanical device, for example, in the form of a spring, which moves the throttle valve 5 into the closing position so that the internal-combustion engine is operated in the idling mode. Of course, it can also be provided in this case that the internal-combustion engine is stopped by switching off the fuel supply.

The described safety system has the advantage that independent quantities can be used for controlling and monitoring the internal-combustion engine. For the purpose of control, any arbitrary operating quantity may be detected which characterizes the engine load (load$_{act}$). In addition to or instead of the momentary air mass flow $m_{act}$, the suction pipe pressure $P_{air}$ and/or the throttle valve position $\alpha_{act}$ can also be used. To control the internal-combustion engine, any arbitrary quantity which influences the engine load load$_{act}$, such as the throttle valve position $\alpha_{act}$, is also adjusted by the engine control unit 4. For the monitoring, the output torque $M_{act}$ of the vehicle is also determined on the basis of the rotational wheel speed $n_{wheel}$.

If the detection of the air mass flow $m_{act}$ fails, the operation of the engine regulating will be faulty. However, the safety system operates independently of this input quantity and can therefore, as described above, switch the internal-combustion engine over to an emergency operation or stop it. If, on the other hand, the sensing of the rotational wheel speed $n_{wheel}$ should fail, the traction control system and the safety system will also fail; but the engine control can continue to operate properly on the basis of the air mass flow $m_{act}$. For the improbable case that the sensing of both the air mass flow $m_{act}$ and the rotational wheel speed $n_{wheel}$ should fail, secure operation of the internal-combustion engine is, however, no longer possible since both the engine control and the safety system will fail. In this case, the internal-combustion engine must be stopped.

Another important advantage of the invention is that the described safety system can also be used in vehicles with a so-called dynamic torque adjustment. Since, in such engine controls, particularly under transient driving conditions, there is no longer a direct coupling between the throttle valve position $\alpha_{act}$ and the torque desired by the driver $M_{des\text{-}FP}$, it is no longer possible to carry out the monitoring on the basis of the throttle valve angle $\alpha_{act}$.

According to the above embodiment of the invention, the torque desired by the driver $M_{des\text{-}FP}$ is determined on the basis of the accelerator pedal position FP. However, it is also possible to use other suitable input quantities for this purpose, such as the output signal of an automatic speed control. Additional possibilities also exist for sensing the rotational wheel speed $n_{wheel}$, in addition to the sensing of an individual rotational wheel speed described in the embodiment. For example, the rotational speeds of several or all wheels 3 can be measured, and from them an effective rotational wheel speed $n_{wheel}$ can be determined in an arbitrary manner. In principle, the output torque $M_{act}$ can, however, be determined at any point of the transmission line. Only the definition of the torque interface must be adapted to the selected point in the transmission line.

As indicated above, it is advantageous for the safety system to provide a traction control system in the vehicle. This may be a simple system, for example an antilock brake system, or it may be a higher-expenditure system, such as a wheel slip control system or a driving dynamics control system. In the case of such traction control systems, the rotational speeds of individual wheels or of all wheels 3 are sensed and analyzed. No additional constructional expenditures are therefore required for the safety system because all sensors and analyzing devices are already required for other tasks. In this case, the safety system is preferably integrated in the traction control system 13, because a high-priority access to the engine control unit 4 already exists for the traction control system 4. Therefore, instead of the reduced desired torque $M_{des\text{-}ASR}$, the corrected desired torque $M_{coor}$ of the safety system is simply applied to the output of the traction control system 13. The communication between the two control units 4, 13 therefore need not be especially adapted to the safety system. In principle, it is also possible to house both control units, 4, 13, together with additional functions in a common control unit. In addition, it is possible to provide a separate control unit for the monitoring module, in which case the actual output torque $M_{act}$ will be transmitted from the ASR control unit 13 or another suitable control unit to the monitoring module.

The safety system described by means of the drawing represents only one possible embodiment. The scope of the invention, however, is not limited to the shown example. On the contrary, the idea of the invention can be applied to almost all engine controls. The engine load $load_{actual}$ is not the sole characterizing quantity for the operating condition of the internal-combustion engine. The operating condition can a so be characterized, for example, by the efficiency (for example, as a function of the ignition point, air/fuel ratio or fuel switch-off), the number of consuming devices (such as the air-conditioning system or the electric generator), or the condition parameters for any of the functions: cylinder switch-off, sequential fuel switch-off, gear, gear change, and power transmission. Naturally, a combination of these quantities or additional quantities can also be used. In principle, all quantities can be used as the input quantity which influence the condition of the internal-combustion engine and thus directly or indirectly the propulsion of the vehicle.

In addition to the desired torque, the desired acceleration or the desired rotational speed (measured on the engine shaft, the transmission shaft or directly at the vehicle wheel) can also be used as the vehicle propulsion requirement. Furthermore, the fuel quantity indication, the throttle valve angle requirement or desired values for the air mass flow or the load can also be used. In addition to the rotational wheel speed, the rotational speed, the acceleration or the torque can be determined as the measuring quantity for the vehicle propulsion at any point in the transmission line. In addition, the vehicle yaw angle, the vehicle pitch angle or the vehicle rolling angle can also be used.

The decisive principle of the invention is only to determine two desired values based on the basis of the driver's input: one desired value corresponding to the desired vehicle propulsion, and the other concerning a quantity for controlling or regulating the internal-combustion engine to adjust the desired vehicle propulsion. In addition, two independent measuring values are sensed from each of which one actual value is determined which is assigned to the corresponding desired value. Finally, two independent control units are provided, one of which is used to controlling or regulate the internal-combustion engine, and the other of which monitors the operation of the internal-combustion engine based on the desired and actual values for the vehicle propulsion, if necessary, sends control commands to the first control unit to correct a faulty function or to render the internal-combustion engine inoperative.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Safety system for a motor vehicle having an internal-combustion engine, comprising:

a sensor for measuring accelerator pedal position;

means for determining an actual value for at least one operating parameter indicative of an operating condition of the internal-combustion engine;

means for determining a value for least one quantity indicative of a vehicle propulsion;

a first analyzing device including means for
   determining a desired vehicle propulsion value and a desired value for the at least one operating parameter indicative of said operating condition of the internal combustion engine, based on measured accelerator pedal position; and
   adjusting the operating parameter indicative of the operating condition of the internal-combustion engine to correspond to the determined desired value thereof; and a second analyzing device including means for
   determining an actual vehicle propulsion value based on the at least one quantity indicative of vehicle propulsion,
   continuously comparing the desired and actual vehicle propulsion values; and
   recognizing a fault in the operation of the system being recognized when the actual value deviates from the desired value.

2. Safety system according to claim 1, wherein a deviation is recognized when a difference value between the desired vehicle propulsion value and the actual vehicle propulsion value exceeds a preset threshold value for a preset time period.

3. Safety system according to claim 1, wherein when a fault is recognized, in the second analyzing device, a corrected vehicle propulsion value is determined based on the difference value and is transmitted to the first analyzing device with a higher priority relative to the desired propulsion value.

4. Safety system according to claim 1, wherein when a fault is recognized, the second analyzing device transmits a signal for reducing the actual vehicle propulsion value according to an intervention adjustment in the first analyzing device.

5. Safety system according to claim 4, wherein when, despite an ignition intervention, the actual vehicle propulsion value exceeds the desired vehicle propulsion value, the second analyzing device transmits a fuel switch-off signal to a fuel distribution device in the first analyzing device.

6. Safety system according to claim 1, wherein when a deviation is recognized, a fault signal is generated and stored in a memory.

7. Safety system according to claim 6, wherein when a deviation is recognized, a fault signal is also indicated to a driver of the vehicle.

8. Safety system according to claim 1, wherein the second analyzing device is a traction control system.

9. Safety system according to claim 1, wherein:

in addition to accelerator pedal position, operating parameters characterizing engine load and output torque of the internal-combustion engine are detected;

in the first analyzing device, a torque desired by the driver on the basis of the accelerator pedal position and a desired load value on the basis of the desired torque value are determined, and the actual load value is adjusted to the desired load value by influencing an operating parameter influencing the engine load; and in the second analyzing device, actual output torque is determined based on the wheel speed and is continuously compared with the desired torque value input by a driver, which is provided by the first analyzing device, and a fault is recognized if the actual output torque deviates from the desired torque.

* * * * *